(12) United States Patent
Pirhonen et al.

(10) Patent No.: US 8,761,728 B2
(45) Date of Patent: Jun. 24, 2014

(54) MANAGEMENT OF MOBILE STATION MEMORY CONTENT

(75) Inventors: Jussipertti Pirhonen, Nokia (FI); Jukka Laukkanen, Terälahti (FI)

(73) Assignee: Carpricode Oy, Oulu (FI)

( * ) Notice: Subject to any disclaimer, the term of this patent is extended or adjusted under 35 U.S.C. 154(b) by 420 days.

(21) Appl. No.: 12/443,074

(22) PCT Filed: Sep. 27, 2007

(86) PCT No.: PCT/FI2007/050523
§ 371 (c)(1),
(2), (4) Date: Mar. 26, 2009

(87) PCT Pub. No.: WO2008/037854
PCT Pub. Date: Apr. 3, 2008

(65) Prior Publication Data
US 2010/0009669 A1    Jan. 14, 2010

(30) Foreign Application Priority Data

Sep. 28, 2006  (FI) ..................................... 20065607

(51) Int. Cl.
| H04M 1/66 | (2006.01) |
| H04M 1/68 | (2006.01) |
| H04M 3/16 | (2006.01) |
| H04M 3/42 | (2006.01) |
| H04B 1/38 | (2006.01) |
| H04W 4/00 | (2009.01) |
| H04W 24/00 | (2009.01) |

(52) U.S. Cl.
USPC ........ 455/410; 455/411; 455/414.1; 455/466; 455/558; 455/435.1; 455/433; 455/456.1

(58) Field of Classification Search
USPC ........... 455/410, 411, 419, 556.2, 550.1, 558, 455/414.3
See application file for complete search history.

(56) References Cited

U.S. PATENT DOCUMENTS

| 5,625,671 A |   | 4/1997 | Salin |
| 5,734,978 A | * | 3/1998 | Hayatake et al. ............. 455/410 |

(Continued)

FOREIGN PATENT DOCUMENTS

| JP | 2001-292222 A | 10/2001 |
| WO | WO 96/36194 A1 | 11/1996 |

(Continued)

OTHER PUBLICATIONS

English translation of Publication No. JP2001-292222, Date of publication of application : Oct. 19, 2001, Inventor : Sasai Nobuo.*

(Continued)

*Primary Examiner* — Dwayne Bost
*Assistant Examiner* — Nalini Mummalaneni
(74) *Attorney, Agent, or Firm* — Birch, Stewart, Kolasch & Birch, LLP

(57) ABSTRACT

The invention relates to a method for an at least partial erasure of the memory content of a mobile station in a mobile communication system. The starting of the erasure of the mobile station memory content is arranged to be responsive to the checking of a unique equipment identity of the mobile station performed in the mobile communication network on the basis of the unique equipment identities included in an equipment register. If a network element providing mobile communication services receives from an equipment register element the information, according to which the mobile station that has contacted the mobile communication network is defined as barred in the equipment register, a message to be sent from the mobile communication network to the mobile station is formed for erasing the memory content of the mobile station. This message is transmitted from the mobile communication network to the mobile station, and the mobile station detects a need for an at least partial erasure of the memory content in response to the reception of said message.

9 Claims, 4 Drawing Sheets

(56) References Cited

U.S. PATENT DOCUMENTS

| | | | |
|---|---|---|---|
| 5,898,783 | A | 4/1999 | Rohrbach |
| 6,741,851 | B1 * | 5/2004 | Lee et al. ................... 455/410 |
| 2002/0120873 | A1 | 8/2002 | Salmivalli |
| 2004/0224665 | A1 | 11/2004 | Kokubo |
| 2005/0228938 | A1 * | 10/2005 | Khare et al. ................ 711/103 |
| 2005/0280557 | A1 | 12/2005 | Jha et al. |
| 2006/0031541 | A1 | 2/2006 | Koch et al. |
| 2006/0079204 | A1 * | 4/2006 | Pon et al. ................... 455/411 |
| 2007/0032232 | A1 * | 2/2007 | Bleckert et al. ............. 455/433 |
| 2009/0209196 | A1 * | 8/2009 | Haverty ........................... 455/1 |

FOREIGN PATENT DOCUMENTS

| | | |
|---|---|---|
| WO | WO 00/45243 A1 | 8/2000 |
| WO | WO-2004/093412 A2 | 10/2004 |
| WO | WO-2006/125112 A2 | 11/2006 |

OTHER PUBLICATIONS

3GPP TS 24.008 V7.2.0 3GPP Technical Specification Group Core Network and Terminals; Mobile Radio Interface Layer 3 Specification; Core Network Protocols; Stage 3; Published Dec. 2005.*

3GPP specification 3GPP TS 29.002 "*Mobile Application Part (MAP) specification; (release 7)*" version 7.4.0 (Jun. 2006).

3GPP specification 3GPP TS 24.008 "*Mobile radio interface Layer 3 specification; Core network protocols; Stage 3*", version 7.4.0 (Jun. 2006).

ETSI TS 100940 "*Mobile radio interface Layer 3 specification; Core network protocols; Stage 3*", version 7.21.0 (Dec. 2003). The 3GPP specification No. is TS 04.08.

ETSI TS 100 508 v7.2.0 (Jun. 1, 2000); Digital cellular telecommunications system (Phase 2+); International Mobile station Equipment Identities (IMEI); (GSM 02.16 version 7.2.0 Release 1998); XP050357496; pp. 1-11.

\* cited by examiner

MANAGEMENT OF MOBILE STATION MEMORY CONTENT

FIELD OF THE INVENTION

The invention relates, generally, to management of a memory content of mobile equipment and, particularly, to a secure erasure of information stored in a memory.

BACKGROUND OF THE INVENTION

Many modern electronic devices include a diversity of data processing features and quite a large amount of memory for storing a user's files. It is also more and more common to store confidential information and documents in equipment used as mobile stations. It is important to develop solutions for hindering the misuse of information stored in mobile stations when, for instance, the mobile station is stolen or lost.

Most mobile communication systems apply replaceable smart cards, which comprise a subscriber's identification application and, e.g. in the GSM system, are often called SIM (subscriber identity module) cards. Solutions have been developed for preventing the use of stolen SIM cards; in U.S. Pat. No. 5,898,783, for instance, a command for making the SIM card inoperative may be sent on the basis of the SIM card identity. However, it is also needed for removal of information that is kept in the memory of mobile equipment. U.S. 2005/0228938 discloses a solution, in which a device server may send an erasure command via a mobile communication network to an electronic device, in response to which at least a part of the mobile station's memory is overwritten. A problem with the above arrangement is that it requires a separate device server and that the stolen mobile station is not necessarily connected to the mobile communication network at the moment the erasure command was sent, wherefore the command will not reach its target.

BRIEF DESCRIPTION OF THE INVENTION

It is an object of the invention to provide an improved solution for a secure erasure of information stored in the memory of mobile equipment. There is provided a method, network element, mobile station and computer program product, which are characterized by what is disclosed in the independent claims. Some preferred embodiments of the invention are disclosed in the dependent claims.

The invention is based on the idea that determination of the need for erasing the memory content of a mobile station is arranged on the basis of checking a unique equipment identity of the mobile station, the checking being performed in the mobile communication network and carried out on the basis of comparison of the unique equipment identity to unique equipment identities included in an equipment register. If the mobile station is defined as barred in the equipment register, a message is sent from the mobile communication network to the mobile station for erasing the memory content of the mobile station in a message of a signalling protocol between the mobile communication network and the mobile station. The mobile station detects the need for an at least partial erasure of the memory content in response to the reception of said message for erasing the memory content of the mobile station. It is to be noted that in this context the erasure of the memory content refers to a process, in which information stored in a memory is deleted, for instance, by overwriting in such a manner that it is impossible or at least difficult to restore the original information.

According to an embodiment of the invention, said identity is an international mobile equipment identity (IMEI) and the register is an equipment identity register of a public mobile communication network.

According to yet another embodiment of the invention, said message is sent in a message of a signalling protocol between the mobile communication network and the mobile station.

The present arrangement provides the advantage that the message for erasing the memory content may be transmitted automatically to the mobile station defined as barred immediately when the mobile station attempts to have service from a mobile communication network element. It is thus more likely that the erasure of the memory content of stolen mobile equipment succeeds, since the message is transmitted only if it can reach its target and the mobile station is in the signalling connection with the mobile communication network. In addition, no specific server system is required to send erasure commands, but it is possible to utilize the existing equipment registers and mobile communication network elements.

BRIEF DESCRIPTION OF THE FIGURES

The invention will now be described in more detail in connection with preferred embodiments and with reference to the attached drawings, in which.

DETAILED DESCRIPTION OF THE INVENTION

Next, an embodiment of the invention is illustrated with reference to a 3GPP system (Third Generation Partnership Project). It is to be noted that the field of application of the invention is not, however, restricted to this or other specific mobile communication system, but the invention may be applied to any current or future mobile communication system for arranging an at least partial erasure of the memory content of an apparatus on the basis of checking the equipment identity status performed by or in request of a mobile communication network element. Examples thereof include second generation systems, such as CDMA or GSM, the basic principles of which also form the basis for many parts of the 3GPP system.

Figure 1:
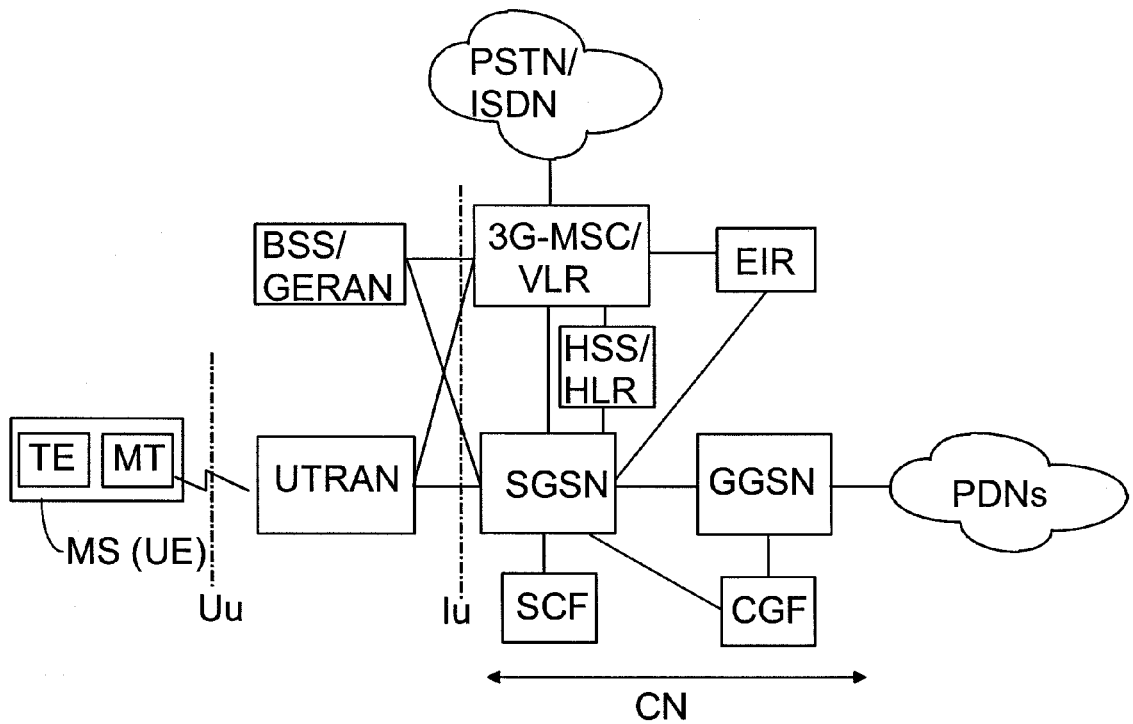
FIG. 1 illustrates elements of a simplified 3GPP system.

A reference is made to FIG. 1, in which the main parts of the mobile communication system are a core network CN and a UMTS terrestrial radio access network UTRAN of the 3GPP mobile communication system, which constitute a fixed network of the mobile communication system, and a mobile station MS, which is also called user equipment UE. The interface between the CN and the UTRAN is called Iu, and the air interface between the UTRAN and the MS is called Uu.

The UTRAN typically comprises several radio network subsystems RNS, the interface therebetween being called Iur (not shown). The RNS comprises a radio network controller RNC and one or more base stations BS, also known as node(s) B. The interface between the RNC and the BS is Iub. The base station BS is responsible for implementing the radio path and the radio network controller RNC manages the radio resources. A connection to the UMTS core network CN may also be provided via a GSM base station subsystem BSS or a GSM/EDGE radio access network (Enhanced Data rates for GSM Evolution) GERAN.

The core network CN comprises an infrastructure external to the UTRAN and belonging to the mobile communication system. In the core network, a mobile switching centre/visitor location register 3G-MSC/VLR is responsible for circuit-switched calls and communicates with a home subscriber server HSS or a home location register HLR (A reference used until the Release 4 architecture and which may be regarded as part of the home subscriber server). A connection to a serving GPRS support node of the packet radio system is established by means of an interface Gs' and to a public switched telephone network PSTN/ISDN via a gateway mobile switching centre GMSC (not shown). A connection of both the mobile switching centre 3G-MSC/VLR and the serving GPRS support node SGSN to the radio network UTRAN is established by means of an interface Iu.

The 3GPP system thus also comprises a packet radio system implemented mainly according to a GPRS system connected to a GSM network, which is why the names of the network elements include references to the GPRS system. The 3GPP packet radio system may comprise several gateway and serving GPRS support nodes and, typically, several serving GPRS support nodes SGSN are connected to one gateway GPRS support node GGSN. The task of the serving GPRS support node SGSN is to detect mobile stations capable of packet radio connections within its service area, to transmit and receive data packets from such mobile stations and to monitor the location of the mobile stations within its service area. The serving GPRS support node SGSN is furthermore in connection with the home subscriber server HSS via an interface Gr. Records associated with the packet radio service and comprising the contents of subscriber-specific packet data protocols are also stored in the home subscriber server HSS. The HSS comprises, for instance, information on PDP contexts allowed for the subscriber and information on the use of services provided by the IMS.

The gateway GPRS support node GGSN serves as a gateway between the 3GPP packet radio system and an external packet data network PDN. External data networks may include e.g. a 3GPP or GSM/GPRS network of another network operator, the Internet, or a private local area network. The gateway GPRS support node GGSN communicates with these data networks via an interface Gi. Data packets to be transferred between the gateway GPRS support node GGSN and the serving GPRS support node SGSN are always encapsulated according to the gateway tunnelling protocol GTP. The gateway GPRS support node GGSN also maintains PDP addresses and routing information of PDP contexts activated for the mobile stations, i.e. SGSN addresses and NSAPI identifiers (Network layer Service Access Point identifier), for example. The routing information is thus used for linking the data packets between the external data network and the serving GPRS support node SGSN. The network between the gateway GPRS support node GGSN and the serving GPRS support node SGSN is a network utilizing the IP protocol. The packet data system may also comprise many other functions, of which FIG. 2 shows a service control function SCH of intelligent network services, preferably CAMEL services, a charging gateway function CGF responsible for charging, and a call session control function CSCF of an IMS system (IP Multimedia Subsystem).

The system comprises an equipment identity register EIR, which is a logical entity and stores IMEI (International Mobile Equipment Identity) identities of mobile stations. The IMEI is thus a unique identity of a mobile station, which may also be called terminal equipment TE. The unique identifier of a mobile subscriber is IMSI (International Mobile Subscriber Identifier), which is an identifier stored in a SIM/USIM (Subscriber Identity Module/UMTS SIM) module included in an IC card to be connected to the apparatus, i.e. a SIM/USIM-specific identifier independent of the mobile station used. The mobile station may be defined as white listed, grey listed or black listed by its equipment identity. The equipment identity register may be implemented in various ways, and the implementation of the present invention is not restricted to any specific embodiment. As a functional entity, the equipment identity register may comprise one or more databases and elements controlling them. Since mobile stations may be classified in different ways into at least two or three different categories, the equipment identity register EIR may also comprise, for instance, three separate lists including the IMEI identities of the mobile equipment belonging to this list. Alternatively, status information is associated with the IMEI identity in the equipment register. The interface between the equipment identity register EIR and the mobile switching centre MSC using it is F. The MSC communicates with the equipment identity register over the interface F in order to check the equipment identity status obtained from the mobile station MS.

When packet-switched services are provided for the mobile station MS, the SGSN may also check the equipment identity status of the mobile station from the equipment identity register EIR by using an interface Gf between the SGSN and the equipment identity register EIR. 3GPP specification 3GPP TS 29.002 version 7.4.0 (2006-06) "Mobile Application Part (MAP) specification; (release 7)" describes the communication of the mobile switching centre MSC and the serving GPRS support node SGSN with the equipment identity register EIR for detecting the status of the mobile equipment in more detail in chapter 8.7. It should also be noted that the mobile switching centre MSC does not necessarily always check the equipment identity status of the mobile station from the equipment identity register EIR, but the status of the mobile equipment may also be checked from the visitor location register VLR, if it is defined therein.

Figure 2:
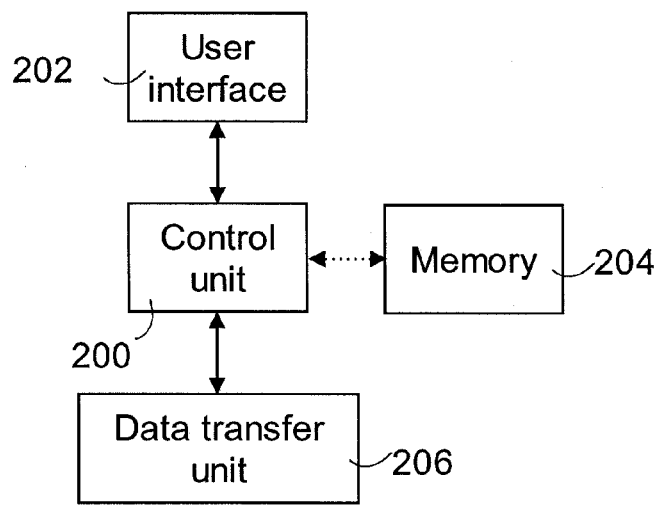
FIG. 2 illustrates the basic structure of an electronic device.

FIG. 2 illustrates functional units of a mobile station MS. The mobile station MS comprises a memory 204, a user interface 202, such as an input device and a display, a transceiver 206 for implementing wireless data transfer, and a control unit 200 implemented by one or more processors. The memory 204 may comprise both volatile memory and non-volatile memory, such as Flash memory or EEPROM (electrically erasable programmable read-only memory). Different applications may be implemented in the mobile station MS by executing a computer program code stored in the memory 204 in the processor of the control unit 200. The mobile station MS may be configured by means of the computer program code executed in the processor of the control unit 200 and/or hardware solutions to implement functions related to the mobile station erasure and implemented in the mobile station MS, the functions being described in greater detail in the following. The computer program code may be stored on a separate memory means, from which it may be loaded on the mobile station MS. The network element, such as the MSC/VLR, also comprises a processing unit, and a computer program code executed therein may arrange it to implement functions that are described for it in the following. The network element may also apply hardware solutions or a combination of software and hardware solutions. The mobile station MS may be, for instance, a conventional mobile phone, a PDA device provided with a mobile communication functionality, or a combination of one or more devices, such as a combination of a portable computer and a mobile communication card.

According to the present embodiment, the network element providing mobile communication services of the mobile communication network sends a message to the mobile station MS in response to the mobile station barring detected on the basis of the checking of the equipment identity of the mobile station. On the basis of this message, an at least partial erasure of the memory content is started in the mobile station.

Figure 3A:
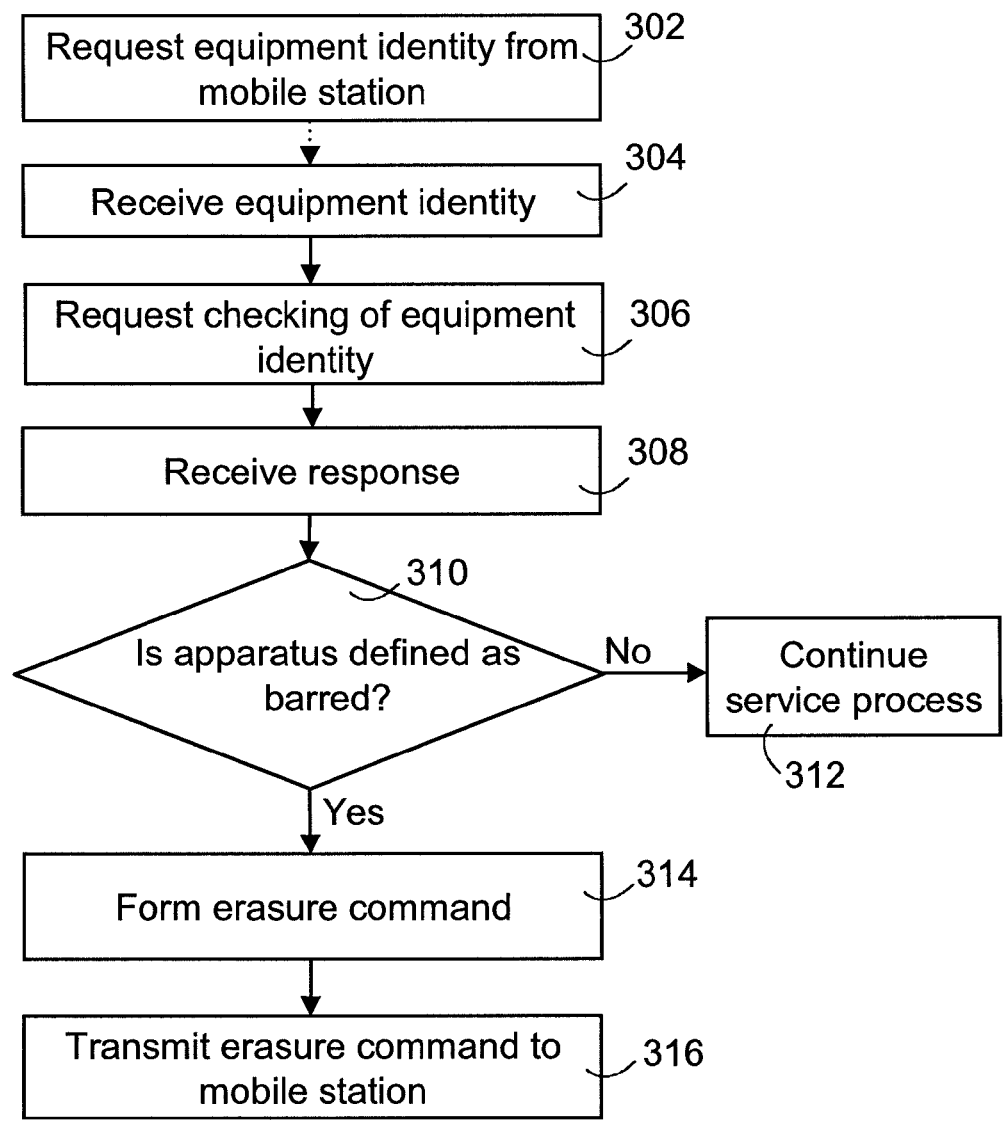
FIGS. 3a and 3b illustrate a method for erasing a mobile station according to a preferred embodiment of the invention.

Next, a method according to a preferred embodiment of the invention is illustrated with reference to FIGS. 3a and 3b. FIG. 3a illustrates features performed in one or more elements of the mobile communication network. The illustrated features may be performed, for example, in the mobile switching centre MSC or the serving GPRS support node SGSN. In step 302, an equipment identity is requested from the mobile station. This step may be reached, for instance, periodically, or when the mobile station requests for a registration and/or a new service, or for some other reason. In this case, the network element transmits the equipment identity request to the mobile station MS. In step 304, the equipment identity is received from the mobile station MS. Steps 302 and 304 may be implemented by using GSM/3GPP signalling procedures known per se. It is to be noted that the network element MSC, SGSN need not necessarily request 302 for an IMEI identity separately, but it may be a part of a service request transmitted by the MS, in which case the network element checks the status of the equipment before providing the service.

In step 306, the network element requests for the checking of the equipment identity from the equipment identity register EIR (or performs it itself on the basis of the information possibly stored in the visitor location register). In this case, the IMEI is transmitted to the equipment identity register EIR by using, for instance, a MAP_CHECK_IMEI service defined in the above-mentioned 3GPP specification 29.002. In step 308, a response to the request is received, indicating the status set for the mobile station or giving at least an indication, if the mobile station is defined as barred (black listed).

In step 310 it is checked whether the mobile station in question is defined as barred on the basis of the response. If the mobile station MS is not defined as barred, the process may advance to step 312 and the serving of the mobile station may be carried on as usually, depending on the service situation. The process may advance to this step, if the mobile station is defined as white listed and possibly if the mobile station is defined as grey listed.

If, on the basis of the information included in the received response, the mobile station MS is defined as barred, an erasure command is formed in step 314 in the method. In step 316, the erasure command is transmitted to the mobile station MS for starting an at least partial erasure of the memory content of the mobile station.

It is to be noted that the method illustrated in FIG. 3a is only an example of a feasible implementation and that other functions related to the equipment management may also be implemented in the mobile communication network. For instance, in step 314 the network element is arranged to reject the service request of the mobile station MS and transmit a rejection message to it. In addition, in the mobile communication network it is also possible to determine a specification to transmit an erasure command or to erase the apparatus in the equipment identity register EIR or some other database.

Figure 3B:
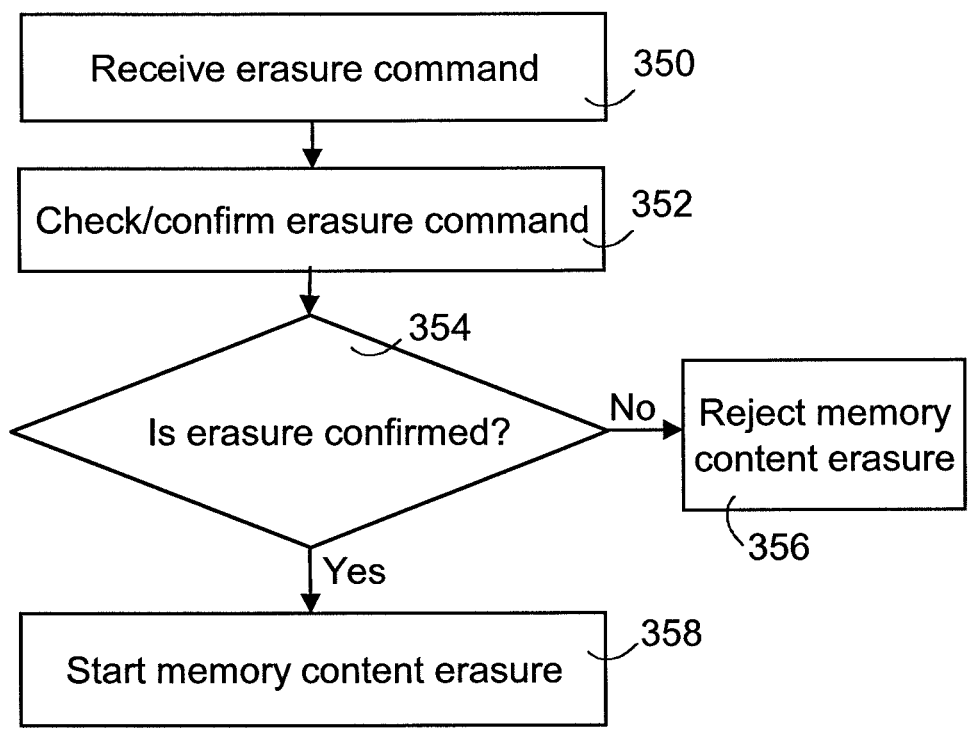

FIG. 3b illustrates features implemented in the mobile station MS and related to the erasure of the memory content of an apparatus on the basis of the checking of the equipment identity of the mobile communication network. These functions may be implemented, for instance with reference to FIG. 2, by software means in the control unit 200. In step 350, the mobile station MS receives the erasure command from the network element providing mobile communication services, such as the mobile switching centre MSC or the serving GPRS support node SGSN.

It is to be noted, also with reference to FIG. 3a, that the erasure command may be an explicit command in a message received from a mobile communication network element, or the mobile station MS may detect 350 the erasure command implicitly when a message with a specific information content is received from the mobile communication network element, such a message being predefined to start the erasure of the memory content. For instance, the erasure command may be determined as a response to a specific reject clause of the service request.

In step 352, the received erasure command is checked, for instance, by confirming its origin. In step 352, various verification or authentication functions may be performed to prevent the erasure of the memory content of the apparatus caused by false erasure commands. The checking or confirmation of the erasure command described in connection with steps 352, 354 may be implemented in various ways. If, on the basis of the checking 352, 354, the erasure command is confirmed as accepted, the erasure is started in step 358. If no erasure is confirmed, the erasure is rejected in step 356 and the apparatus may be used in a conventional way. An at least partial erasure of the memory content of the non-volatile memory 204 of the apparatus, performed after step 358, may be implemented by various methods. The memory content erasure may be implemented by an erasure application or functionality that is separate from the application receiving the erasure command.

According to an embodiment, after the memory content erasure or in connection with step 358, a confirmation of the erasure is transmitted from the mobile station MS to the mobile communication network, e.g. to the element which has transmitted the erasure command and provides the mobile communication network services. The network element that has received the confirmation may then store the information on the erasure of the apparatus in a database, such as an equipment identity register or the like, and possibly transmit the message to an entity, subscriber or other party that is defined as the possessor of the apparatus and has requested that the apparatus should be black listed. After the memory content of the mobile station MS is erased at least partially, the mobile station may also be locked according to an embodiment. Different methods may be used for this, for instance so that the apparatus asks for a specific password in order to be turned on or the apparatus is locked entirely to prevent the use. According to an embodiment, by changing the equipment identity of the mobile station MS, the mobile station may be taken into use again.

According to an embodiment, no separate erasure command is used, but a specific message between the mobile communication network element MSC, SGSN and the mobile station MS is predefined to start the erasure of the memory content. More specifically, the erasure of the memory content may be determined to be started when the message of the signalling protocol between the network element MSC, SGSN and the MS includes a predefined data element. An example of such data elements is a reject clause, which indicates that the equipment identity is not accepted or indicates in some other way that the service cannot be provided for the mobile station. This data element may be specified in the response message of the request associated with mobile communication services; some embodiments are illustrated in the following.

Figure 4A:
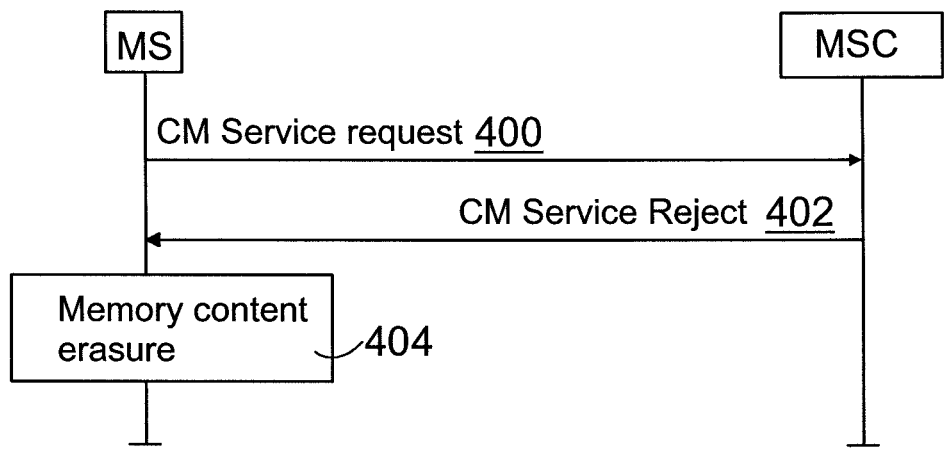
FIGS. 4a and 4b illustrate embodiments of the invention as signalling diagrams.

FIG. 4a illustrates an embodiment, in which the mobile station MS transmits a connection management (CM) service request 400 to the mobile switching centre MSC. The request 400 may comprise an IMEI equipment identity. The MSC checks the IMEI identity. If the IMEI is defined as black listed, the MSC is arranged to transmit a response 402, which includes the reject clause "IMEI not accepted". After receiving the response 402, the MS checks the reject clause and starts 404 the at least partial erasure of the memory content (after feasible confirmation measures), because the reject clause is predefined as a clause implementing the erasure, i.e. an implicit erasure command.

Figure 4B:
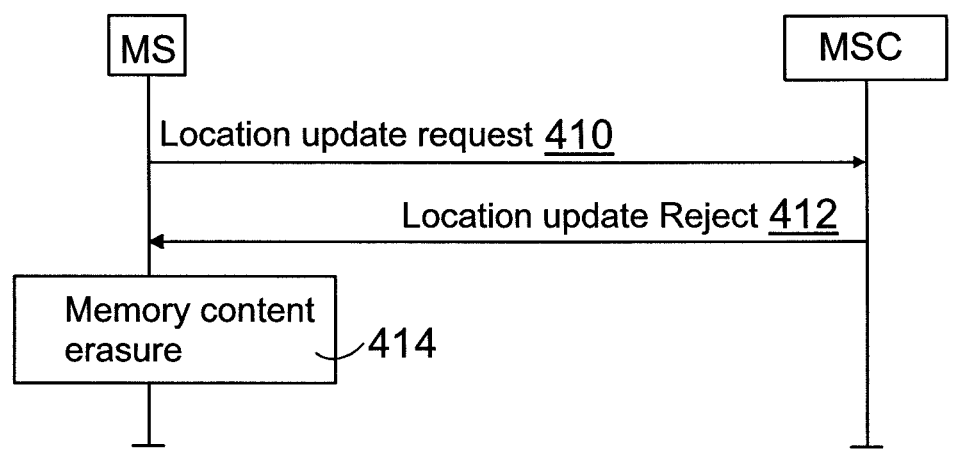

FIG. 4b illustrates a second embodiment, in which, in response to a location updating reject message 412 indicating a rejection of the IMEI identity, the MS may start the erasure 414 of the memory content.

The signalling examples of FIGS. 4a and 4b are only some example of messages, which may be used to indicate the need for an at least partial erasure of the memory content of the mobile station MS. Other messages between the MS and the MSC, such as an IMSI (international mobile subscriber identifier) attach reject message, may also be utilized for starting the erasure. 3GPP specification 3GPP TS 24.008, "Mobile radio interface Layer 3 specification; Core network protocols; Stage 3", version 7.4.0 (2006-06) describes a DTAP (direct transfer application part) protocol responsible for mobility management and connection management between the MS and the MSC and also for procedures used for mobility management of the GPRS system between the MS and the SGSN. Messages and data elements defined in this specification may be utilized for indicating the need for erasure. Chapter 10.5.3.6 describes how the reject clause included in the response message is defined and how a specific reject clause value may indicate "IMEI not accepted". As to the GSM system of the previous Release 1998 version, a reference is made to the specification ETSI TS 100940, "Mobile radio interface Layer 3 specification; Core network protocols; Stage 3", V7.21.0 (2003-12), the 3GPP specification number of which is TS 04.08.

According to yet another embodiment, the network element providing mobile communication services, such as the MSC or the SGSN, is arranged to specifically request for the IMEI identity from the mobile station MS. This request may be arranged, for example, by means of an identification procedure defined in said 3GPP specification 3GPP TS 24.008, chapter 4.3.3, wherein the MSC transmits an IDENTITY REQUEST. If the identity of the MS is defined as black listed, an IDENTITY RESPONSE with a reject clause indicating the rejection of the IMEI is transmitted.

According to an embodiment, a specific equipment management command is used for implementing the erasure of the memory content of the mobile station MS. In this case, the mobile communication network element, such as the MSC or the SGSN, is arranged to determine an explicit erasure command in step 314. This erasure command may be an additional clause in a known signalling message (e.g. one of the above-mentioned messages) between the mobile communication network element (MSC, SGSN) and the mobile station MS. For instance, in the connection management service request reject (CM SERVICE REJECT) a specific field or a specific value is determined for a known field, which indicates the erasure command to the mobile station MS.

In addition to or instead of the above-mentioned messages associated with the circuit-switched services, it is possible to arrange the transmission of an erasure command (which may be the indication of an erasure need) by means of a message related to packet-switched services. According to an embodiment, the SGSN is arranged to perform at least some of steps 302 to 316 illustrated above. In this embodiment, the at least partial erasure of the memory content of the mobile station may be started on the basis of one or more predefined messages. For instance, one of the response messages defined for the packet system in the above-mentioned 3GPP specification 3GPP TS 24.008 may be utilized. The erasure command may be based on, for example, a GMM (GPRS mobility management) reject clause, whereby a reference is made to chapter 10.5.5.14.

According to an embodiment, a separate element or message is used as an erasure command, whereby a protocol functionality is defined between the mobile station MS and the network element SGSN, MSC providing mobile communication services for starting the erasure of the memory content controlled by the network element. In this case, the network element is arranged to determine a direct erasure command in a predefined message or message element, and the MS acts in response to this command.

According to an embodiment, the erasure command may be transmitted on a protocol layer higher than the above-mentioned protocol functionalities by using a circuit-switched or packet-switched bearer service, for instance. The network element of the mobile communication system may implement a separate application, which transmits, in response to the checking of the equipment register in step 310, the erasure command to the mobile station MS in step 312 by utilizing the following data transfer service.

The erasure of the memory content started in step 358 may be arranged by applying one or more data erasure, data destruction or disk purging methods in order to delete the data and achieve the desired security level. The selected erasure algorithm is thus used fro destroying stored data, such as different files and a file structure, from the memory 204. The employed method may destroy the file structure. According to an embodiment, the original data are deleted and the storage areas are overwritten by a specific value (e.g. only zeros or a specific bit pattern) or random data. The memory overwriting may be carried out many times in order to raise the security level further. The memory overwriting may also be implemented only partially, e.g. for every n:th memory sector. These methods may also be combined to achieve a multistep and very secure data deletion. According to an embodiment, to erase the memory 204 of the mobile station at least partially, a method is applied, which meets the requirements of the standard DoD5220.22 (M), according to which the erasure of the apparatus is performed in such a manner that it is impossible to restore the data from the memory of the apparatus. However, it is to be noted that the field of application of the invention is not restricted to any particular erasure method and that measures other than those mentioned above may be applied after step 358.

It is also to be noted that data, such as certain folders of a directory structure, or more specifically storage areas, such as those allocated to a user, which are erased after step 358, may be predefined in the mobile station MS. The non-volatile memory 204 may comprise a plurality of subsections, only some of which are predefined to be erased after step 358. In this case, the control unit 200 controlling the erasure is also arranged to select the storage areas to be erased, and it may then overwrite these storage areas. Alternatively, storage areas to be erased are not limited, but, for instance, all addressable memory locations are overwritten several times.

As was described above, on the basis of the computer program code and the settings pre-stored in the memory 204 the control unit 204 of the mobile station may be arranged to carry out the illustrated measures related to the memory content erasure and the starting thereof in the mobile station MS. According to an embodiment, the mobile station MS executes an application, which implements the at least partial erasure of the memory content of the memory 204 in response to step 358. This application may be part of the functionality implementing the general memory management, or an independent application process. The application may control the erasure and overwriting of the data in the memory 204 according to the used erasure method in response to entering step 358. The application may be implemented by means of a computer program code to be executed in the control unit 200. The application may be functionally connected to the mobile communication functionality in such a manner that the message for starting step 350 or 358 is detected. Thus, the application may be responsible for implementation of the functionality related to the above-described erasure of the entire or at least some of the memory content and the starting thereof in the mobile station MS. According to another embodiment, the entity managing the mobile communication, such as the mobility management entity or the connection management entity, is arranged to start the memory content erasure in response to entering step 358. The entity managing the mobile communication may then, for instance, start the application controlling the erasure of said memory content. In this embodiment, the entity managing the mobile communication is arranged to implement the functionality for detecting and confirming the erasure message, or a third application may be used. As stated previously, it is to be noted that the above applications and entities may be implemented by means of a computer program code to be executed in the control unit 200 and/or as a hardware implementation, and the functionality associated with the erasure of the equipment may be implemented in a manner different from above.

According to yet another embodiment, at least some of the above measures related to the starting of the erasure are implemented by means of a separate IC card (not shown in FIG. 2), such as a UICC card connected to the mobile equipment and comprising a SIM or USIM application. The application to be executed in the processor of the card may start the erasure of the memory content of the mobile equipment, for instance, by controlling the processor 200 of the mobile equipment to perform measures associated with the erasure.

It is obvious to a person skilled in the art that as technology advances, the basic idea of the invention may be implemented in various ways. The invention and the embodiments thereof are thus not restricted to the above examples but may vary within the scope of the claims. Different features may thus be left out, processed or replaced by equivalent ones.

The invention claimed is:

1. A method for an at least partial erasure of data stored in a mobile equipment, the method comprising:
   determining of need for erasing memory content of a mobile equipment of a mobile station only on the basis of checking a unique equipment identity of the mobile equipment performed periodically or in direct response to a request for registration or a new service from the mobile station, the checking being performed in a mobile communication network and carried out on the basis of comparison of the unique equipment identity to equipment identities included in an equipment register,
   forming, in response to the network element providing mobile communication services receiving from an equipment register element information, according to which the mobile equipment that has contacted the mobile communication network is defined as barred in the equipment register, a message to be sent from the mobile communication network to the mobile station for erasing the memory content of the mobile equipment, said message being a signaling message of a mobility management protocol from the network element to the mobile station in response to a signaling message from the mobile station and comprising an indicator of an erasure command, the erasure command being in a specific field of said message, said message being a CM Service Reject message or Location update Reject message,
   transmitting said message from the mobile communication network to the mobile station,
   receiving said message in the mobile station,
   detecting need for an at least partial erasure of the memory content in response to the reception of said message for erasing the memory content of the mobile equipment;
   providing a control unit for controlling the erasure, said control unit being configured to select at least one subsection of the memory of the mobile equipment to be erased and to overwrite the selected subsections of the memory with random data multiple times; and
   erasing at least part of the memory content of the mobile equipment,
       wherein said at least part of the memory content that is erased includes predefined subsections of a non-volatile memory of the mobile equipment.

2. A method as claimed in claim 1, wherein said identity is an international mobile equipment identity and the register is an equipment identity register of a public mobile communication network.

3. A network element for a mobile communication network, the network element comprising a memory and a processing unit and being arranged to provide mobile communication services for a mobile station comprising a mobile equipment, connected to the mobile communication network, wherein the network element is provided with a control function for controlling the at least partial erasure of the memory content of the mobile equipment to be responsive to the checking of a unique equipment identity of the mobile equipment performed periodically or in direct response to a request for registration or a new service from the mobile station in the mobile communication network on the basis of comparison of the unique equipment identity to unique equipment identities included in the equipment register,
   the network element is configured to form, in response to the network element receiving from an equipment register element information, according to which the mobile equipment of the mobile station that has contacted the mobile communication network is defined as barred in the equipment register, an erasure command to be sent to the mobile station for erasing the memory content of the mobile equipment at least partially, and
   the network element is configured to transmit said erasure command from the mobile communication network to the mobile station in response to a signaling message from the mobile station, the erasure command being in a specific field of a signaling message, the signaling message from the network element to the mobile station being a CM Service Reject message or Location update Reject message, of a mobility management protocol between the network element and the mobile station,
   wherein the network element further comprises a control unit configured to select at least one subsection of the memory of the mobile equipment to be erased and to overwrite the selected subsections of the memory with random data multiple times, and said at least part of the memory content that is erased includes predefined subsections of a non-volatile memory of the mobile equipment.

4. A network element as claimed in claim 3, wherein said identity is an international mobile equipment identity and the register is an equipment identity register of a public mobile communication network.

5. A network element as claimed in claim 4, wherein the network element is a mobile switching center of a core network of the mobile communication system for providing circuit-switched services or a support node element for providing packet-switched services, and
the network element is configured to determine a predefined element in a response message of a mobility management request, a connection management request or a session management request of the mobile station in order to indicate the erasure command.

6. A mobile station comprising a memory, a processing unit, and a transceiver for implementing wireless data transfer, wherein the mobile station is configured to transmit its mobile equipment's unique equipment identity to a mobile communication network in response to a checking of a unique equipment identity of the mobile equipment performed by the mobile communication network periodically or in direct response to a request for registration or a new service from the mobile station,
the mobile station is configured to receive a message for at least partial erasure of the memory content of the mobile equipment from a network element providing mobile communication services, the message being formed in response to the mobile equipment being defined as barred in an equipment register element of the mobile communication network or the message comprising information that the mobile equipment is defined as barred in the mobile communication network, and the message being a signaling message of a mobility management protocol from the network element to the mobile station in response to a signaling message from the mobile station and comprising an indicator of an erasure command in a specific field of the message, the message being a CM Service Reject message or Location update Reject message, and
the mobile station is configured to start at least partial erasure of the memory content in response to the reception of the message for erasing the memory content of the mobile equipment,
wherein the mobile equipment further comprises a control unit for controlling the erasure, said control unit being configured to select at least one subsection of the memory of the mobile equipment to be erased and to overwrite the selected subsections of the memory with random data multiple times, and said at least part of the memory content that is erased includes predefined subsections of a non-volatile memory of the mobile equipment.

7. A mobile station as claimed in claim 6, wherein said identity is an international mobile equipment identity and the register is an equipment identity register of a public mobile communication network.

8. A mobile station as claimed in claim 6, wherein the mobile station is configured to check or confirm the message, and
the mobile station is configured to start or prevent the at least partial erasure of the memory content of the mobile equipment on the basis of the result.

9. A non-transitory computer-readable memory medium storing a computer program and to be executed in a processor of a mobile equipment, the computer program comprising:
a program code for controlling a mobile station to receive from a network element providing mobile communication services, a message for erasing memory content of the mobile equipment of the mobile station at least partially, the message being formed in response to the definition of the mobile equipment as barred in an equipment register element of a mobile communication network or the message comprising the information that the mobile equipment is defined as barred in the mobile communication network after a checking of a unique equipment identity of the mobile equipment performed by the mobile communication network periodically or in direct response to a request for registration or a new service from the mobile station, said message being a signaling message of a mobility management protocol between the network element and the mobile station in response to a signaling message from the mobile station and comprising an indicator of an erasure command in a specific field of said message, said message being a CM Service Reject message or Location update Reject message, and
a program code for controlling the mobile station to start the at least partial erasure of the memory content of the mobile equipment in response to the reception of said message for erasing the memory content of the mobile station; and
a program code for controlling the erasure, said control unit being configured to select at least one subsection of the memory of the mobile equipment to be erased and to overwrite the selected subsections of the memory with random data multiple times,
wherein said at least part of the memory content that is erased includes predefined subsections of a non-volatile memory of the mobile equipment.

* * * * *